United States Patent
Lee

(10) Patent No.: US 10,051,481 B2
(45) Date of Patent: Aug. 14, 2018

(54) ELECTRONIC APPARATUS AND SENSOR ARRANGEMENT METHOD THEREOF

(71) Applicant: SAMSUNG ELECTRONICS CO., LTD., Suwon-si, Gyeonggi-do (KR)

(72) Inventor: Jun-ho Lee, Seoul (KR)

(73) Assignee: SAMSUNG ELECTRONICS CO., LTD., Suwon-si, Gyeonggi-do (KR)

(*) Notice: Subject to any disclaimer, the term of this patent is extended or adjusted under 35 U.S.C. 154(b) by 0 days.

(21) Appl. No.: 15/414,995

(22) Filed: Jan. 25, 2017

(65) Prior Publication Data

US 2017/0238192 A1 Aug. 17, 2017

(30) Foreign Application Priority Data

Feb. 11, 2016 (KR) .................... 10-2016-0015646

(51) Int. Cl.
| | |
|---|---|
| H04W 24/04 | (2009.01) |
| H04W 16/24 | (2009.01) |
| H04W 4/00 | (2018.01) |
| H04W 4/70 | (2018.01) |
| H04W 84/18 | (2009.01) |

(52) U.S. Cl.
CPC .......... *H04W 16/24* (2013.01); *H04W 4/005* (2013.01); *H04W 4/70* (2018.02); *H04W 24/04* (2013.01); *H04W 84/18* (2013.01)

(58) Field of Classification Search
CPC .............................. H04W 84/18; H04W 24/04
USPC .... 455/551, 67.11, 456.1, 456.2, 458, 456.6, 455/457
See application file for complete search history.

(56) References Cited

U.S. PATENT DOCUMENTS

| | | | |
|---|---|---|---|
| 2007/0124126 A1* | 5/2007 | Lee | ..................... G06F 17/5009 703/6 |
| 2007/0255522 A1 | 11/2007 | Gordon et al. | |
| 2009/0325484 A1 | 12/2009 | Lele et al. | |
| 2012/0280798 A1 | 11/2012 | Li et al. | |
| 2013/0226353 A1* | 8/2013 | Park | ...................... G05B 15/02 700/276 |

FOREIGN PATENT DOCUMENTS

| | | |
|---|---|---|
| KR | 10-2009-0022247 | 3/2009 |
| KR | 10-2009-0132319 | 12/2009 |
| KR | 10-2011-0060621 | 6/2011 |
| KR | 10-2011-0110909 | 10/2011 |
| KR | 10-2012-0001687 | 1/2012 |
| KR | 10-2013-0096907 | 9/2013 |
| KR | 10-1556418 | 10/2015 |

OTHER PUBLICATIONS

Search Report and Written Opinion dated Apr. 27, 2017 in counterpart International Patent Application No. PCT/KR2017/000869.

* cited by examiner

*Primary Examiner* — John J Lee
(74) *Attorney, Agent, or Firm* — Nixon & Vanderhye, P.C.

(57) ABSTRACT

A sensor arrangement method is provided. The method includes, in response to an event to additionally arrange a first sensor in a preset service area occurring, identifying sensing coverage and network coverage of a second sensor based on position information, state information, and network information of a pre-arranged at least one second sensor, and determining an arrangement position of the first sensor based on sensing coverage and network coverage of the second sensor, and sensing coverage and network coverage of the first sensor.

20 Claims, 15 Drawing Sheets

1000

1000'

100

ELECTRONIC APPARATUS AND SENSOR ARRANGEMENT METHOD THEREOF

CROSS-REFERENCE TO RELATED APPLICATION

This application is based on and claims priority under 35 U.S.C. § 119 to Korean Patent Application No. 10-2016-0015646, filed on Feb. 11, 2016 in the Korean Intellectual Property Office, the disclosure of which is incorporated by reference herein in its entirety.

BACKGROUND

1. Field

The present disclosure relates generally to an electronic apparatus, and a sensor arrangement method thereof, and for example, to an electronic apparatus which guides a position of sensor arrangement and a sensing method thereof.

2. Description of Related Art

In accordance with development of electronic technologies, various types of network services have been provided.

Existing home network system indicates a system in which, by performing network matching between a home network installed in home and an external communication network, intelligent communication is available. Through this networking, sharing of information resources in home and efficiency of individual products can be maximized and/or improved.

However, recently, in order to satisfy user's needs for new and various functions, an internet of things which enable information sharing by connecting objects via networks in various fields such as house appliances, electronic goods, health care, remote checking, smart home, and smart car are gaining increasing attention.

Accordingly, a method which can more efficiently utilize internet of things (hereinafter, "IoT") is needed.

SUMMARY

Example embodiments of the present disclosure address the above disadvantages among other things.

According to an example embodiment, an electronic apparatus which efficiently guides an arrangement position of a sensor in a network environment and a method for arranging the sensor are provided.

According to an example embodiment, a method for sensor arrangement is provided. The method includes, identifying, in response to an event to arrange a first sensor in a preset service area occurring, sensing coverage of a pre-arranged at least one second sensor based on position information, state information and network information of the at least one second sensor; and determining an arrangement position of the first sensor based on sensing coverage and network coverage of the second sensor, and sensing coverage and network coverage of the first sensor.

The identifying may include, in response to the event occurring, transferring an information request signal to the second sensor; and receiving, from the second sensor, the position information, the state information, and the network information based on the information request signal.

The identifying may include receiving, from the second sensor, sensor type information and identifying sensing coverage and network coverage of the second sensor based on the position information, the state information, the network information, and the sensor type information of the second sensor.

The state information may include at least one of output state information which indicates power state capable of being sensed, operation state information which indicates a function currently being sensed, and battery state information.

The identifying may include identifying network coverage of the second sensor based on at least one communication network supported by the second sensor and a battery state of the second sensor, respectively; and identifying sensing coverage of the second sensor based on at least one of a sensor type, a current output state, and a battery state of the second sensor.

The determining a position of the first sensor may include determining an arrangement position of the second sensor which changes based on an arrangement position of the determined first sensor.

The determining an arrangement position of the first sensor may include, in response to the first sensor being a directional sensor, arranging the first sensor at a preset position.

The method may further include transmitting a control signal to control an operation state of at least one of the first sensor and the second sensor to the second sensor, based on an arrangement position of the first sensor and the second sensor.

The method may further include, determining a re-arrangement position of a remaining sensor in response to an event to remove one of the at least one pre-arranged sensor occurring, the re-arrangement position being based on sensing coverage of the removed sensor, and sensing coverage and network coverage of the remaining sensor.

The method may further include arranging and displaying the first sensor on an area arrangement map corresponding to the service area and arranged at a position corresponding to the second sensor, based on the determined position, wherein the arranging and displaying the first sensor may include differently displaying the first sensor and the second sensor based on at least one of a sensor type and a network type of the first sensor and the second sensor.

According to an example embodiment, the electronic apparatus includes a display; and a processor configured to, in response to occurrence of an event to arrange a first sensor in a preset service area, identify sensing coverage and network coverage of at least one second sensor based on position information, state information, and network information of a pre-arranged at least one second sensor, to determine an arrangement position of the first sensor based on sensing coverage and network coverage of the second sensor and sensing coverage and network coverage of the first sensor, and to provide the determined position through the display.

The electronic apparatus may further include a communicator comprising communication circuitry, wherein the processor is configured to, in response to the event occurring, control the communication circuitry of the communicator to transfer an information request signal to the second sensor, and to receive, from the second sensor, the position information, the state information, and the network information based on the information request signal.

The processor is further configured to receive, from the second sensor, sensor type information, and to identify sensing coverage and network coverage based on the position information, the state information, the network information, and the sensor type information of the second sensor.

The state information may include at least one of output state information which indicates power state capable of being sensed, operation state information which indicates a function currently being sensed, and battery state information.

The processor may identify network coverage of the second sensor based on at least one communication network supported by the second sensor and a battery state of the second sensor, respectively, and identify sensing coverage of the second sensor based on at least one of a sensor type, a current output type, and a battery state of the second sensor.

The processor may further determine an arrangement position of the second sensor which changes based on an arrangement position of the determined first sensor.

The processor, in response to the first sensor being a directional sensor, may arrange the first sensor at a preset position.

The processor, based on an arrangement position of the first sensor and the second sensor, may transfer a control signal to control an operation state of at least one of the first sensor and the second sensor to the second sensor.

The processor, in response to occurrence of an event to remove one of the at least one pre-arranged sensors, may determine a re-arrangement position of a remaining sensor based on sensing coverage and network coverage of the remaining sensor.

The processor may control the display to arrange and display the first sensor on an area arrangement map corresponding to the service area and arranged at a position corresponding to the second sensor, based on the determined position, and display the first sensor and the second sensor differently based on at least one of a sensor type and a network type of the first sensor and the second sensor.

As described above, according to the present disclosure, information on optimal and/or improved sensor arrangement position can be provided for initial installment of a sensor, changing a position, and adding a sensor and thus, user convenience can be improved.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1A:
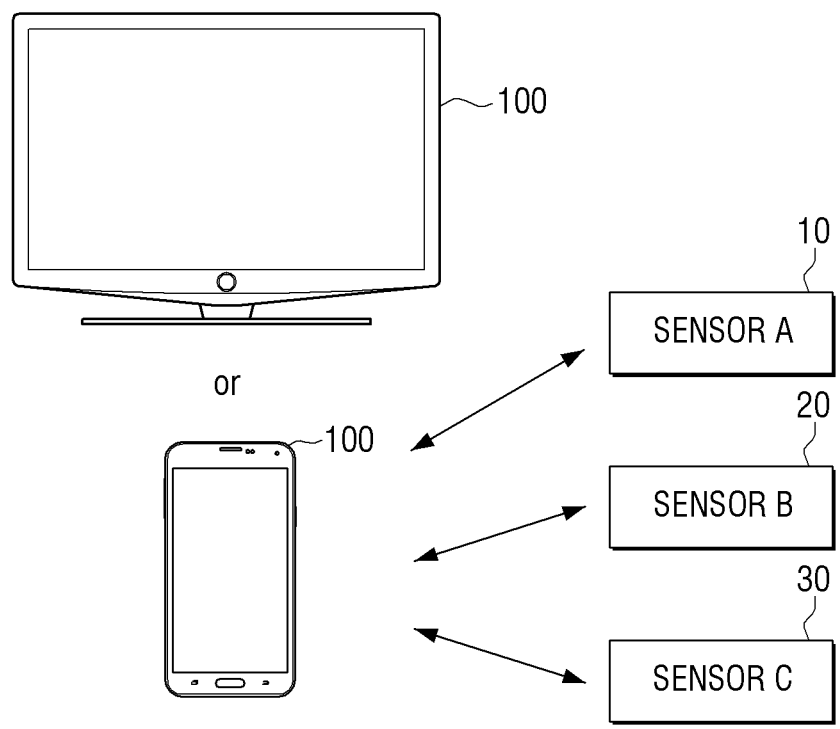
FIG. 1A is a diagram illustrating an example electronic system according to an example embodiment of the present disclosure.

Before describing the various example embodiments in more detail, the terminology used herein will be briefly explained.

The terms used herein are selected from the general terms that are widely used at present and in consideration of the functions in the present disclosure, but at the same time, the terms may vary depending on the intent of those skilled in the art or the precedents, or by the emergence of new technologies. Further, certain terms may be arbitrarily chosen, in which case the corresponding meaning will be described in detail in the disclosure. Accordingly, the terms used herein will be defined not simply based on the names of the terms, but based on the meanings of the terms and the context throughout the description.

The example embodiments of the present disclosure may have a variety of modifications and several examples. Accordingly, while various example embodiments are described in detail herein, these are not intended to limit the scope of the present disclosure to any particular example embodiments. Rather, it should be understood that the example embodiments encompass all the modifications, equivalents or replacements that fall under the concept and technology scope as disclosed. In describing the example embodiments, well-known functions or constructions may not be described in detail when they obscure the disclosure with unnecessary detail. Further, the terms described below are those that are defined in consideration of the functions of the present disclosure and may be varied according to users, operators or practices. Accordingly, definitions will have to be made based on the content provided throughout the description.

The terms such as "first," "second," and so on may be used to describe a variety of elements, but the elements should not be limited by these terms. The terms are used only for the purpose of distinguishing one element from another.

A singular expression includes a plural expression, unless otherwise specified. It is to be understood that the terms such as "comprise" or "consist of" are used herein to designate a presence of characteristic, number, step, operation, element, component, or a combination thereof, and not to preclude a presence or a possibility of adding one or more of other characteristics, numbers, steps, operations, elements, components or a combination thereof.

In the example embodiments of the present disclosure, a 'module' or a 'unit' may perform at least one function or operation, and be implemented as hardware (e.g., circuitry) or software, or as a combination of hardware and software. Further, except for the 'module' or the 'unit' that has to be implemented as particular hardware (e.g., a dedicated processor), a plurality of 'modules' or a plurality of 'units' may be integrated into at least one module and implemented as at least one processor (not illustrated).

In the example embodiments of the present disclosure, when a certain portion is "coupled" with another portion, this means not only the "direct coupling", but also "electrical coupling" and may be accomplished with intervention of another device interposed therebetween. Further, when a certain portion "comprises" a certain element, unless otherwise specified, this means that the certain portion may additionally include another element, rather than precluding another element.

The present disclosure will be described in greater detail below with reference to the accompanying drawings to enable those skilled in the art to understand the present disclosure with ease. However, the present disclosure may be implemented as several different forms and not to be limited to any of specific examples described herein. Further, in order to clearly describe the present disclosure in the drawings, portions irrelevant to the description may be omitted, and throughout the description, the like elements are given the similar reference numerals.

FIG. 1A is a diagram illustrating an example electronic system according to an example embodiment of the present disclosure. According to FIG. 1, an electronic system 1000 includes an electronic device 100 and a plurality of sensors 10, 20, and 30.

The electronic system 1000 can be embodied so that objects in a specific service area are connected via network based on the internet and an internet of things (IoT) service which shared information can be provided.

The electronic apparatus 100 is capable of communicating with a plurality of sensors 10, 20, and 30, and can be embodied as a mobile phone such as a smartphone, a television (TV), or the like, but it is not limited thereto. It can be embodied as various types of devices having display functions such as, for example, and without limitation, a tablet PC, PMP, PDA, and Navigator.

The plurality of sensors 10, 20, and 30 can be embodied as various IoT service devices. For example, the plurality of sensors 10, 20, and 30 can be embodied as various devices having a communication function and a sensor function, for example, lighting-related devices such as a light, a blind, and an illumination sensor, heating/cooling devices such as an air-conditioner, heater, boiler, temperature sensor, and environmental devices such as an air cleaner, humidifier, humidity sensor, optical sensor, pressure sensor, and gas sensor or the like, but are not limited thereto. This is merely an example and a device can be embodied as various types such as a refrigerator, a washing machine, a monitor, a DVD player, a smartphone, a digital camera, and an e-frame, or the like, but is not limited thereto.

Meanwhile, according to an example embodiment of the present disclosure, the electronic apparatus 100, as a sensor is added/removed to/from the IoT network where a plurality of sensors are connected, may identify an optimal and/or improved position of the plurality of sensors and provide it to a user. The service according to an example embodiment of the present disclosure can be embodied to be performed by an application which a user directly uses on an OS. In addition, the application can be provided as an icon interface on a screen of the user electronic apparatus 100 or other electronic devices, but it is not limited thereto. As another example, the service according to an embodiment can be embodied as a network device not having a display or can be stored and executed in a program of a server.

Figure 1B:
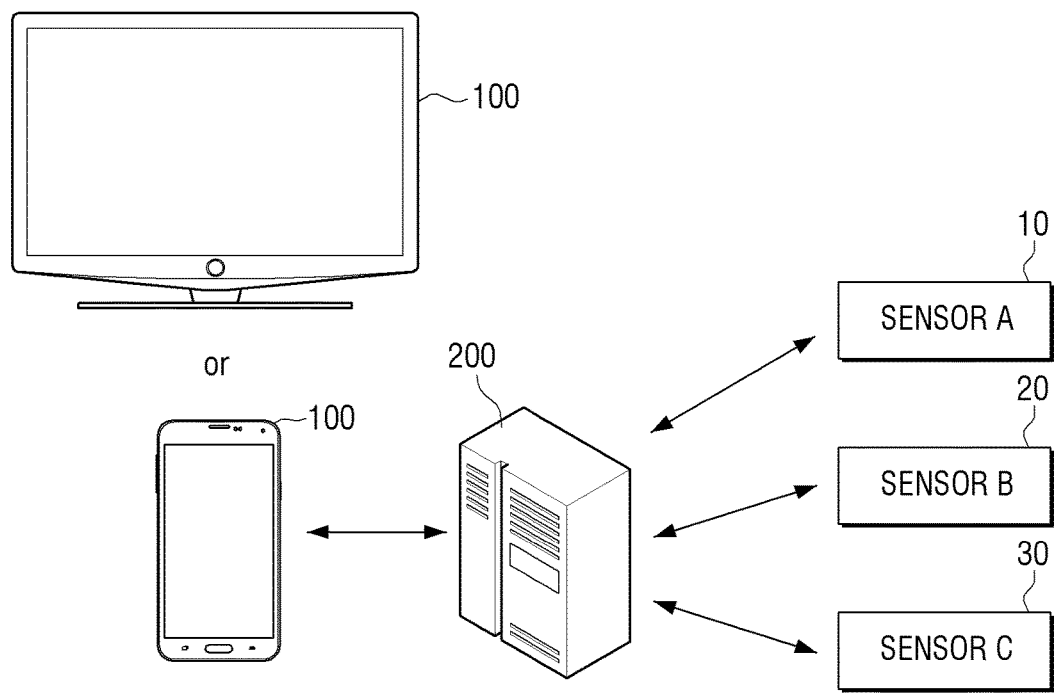
FIG. 1B is a diagram illustrating an example electronic system according to an example embodiment of the present disclosure.

FIG. 1B is a diagram illustrating an example electronic system according to an example embodiment of the present disclosure. According to FIG. 1B, an electronic system 1000' may include the electronic apparatus 100, the plurality of sensors 10, 20, and 30, and a server (or a network device) 200. In this case, the server 200 may communicate with the plurality of sensors 10, 20, and 30, perform a function related to sensor arrangement, and transmit sensor arrangement information to the electronic apparatus 100. The server 200 may be a central server (or integrated server) which is in charge of mutual operation between various OS and applications or a cloud server using cloud computing technology. It can be an Internet hub device, gateway device, or the like, but is not limited thereto.

Figure 2:
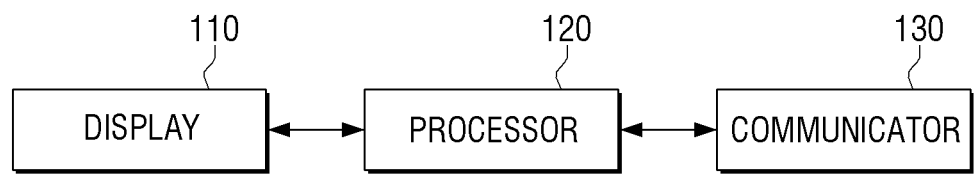
FIG. 2 is a block diagram illustrating an example configuration of an electronic apparatus according to an example embodiment of the present disclosure.

FIG. 2 is a block diagram illustrating an example configuration of an electronic apparatus according to an example embodiment of the present disclosure.

According to FIG. 2, the electronic apparatus 100 includes a display 110, a processor (e.g., including processing circuitry) 120 and a communicator (e.g., including communication circuitry) 130.

The display 110 displays a screen. For example, the screen may include an application execution screen including various contents such as an image, a video, a text, and music, and graphic user interface (GUI), and so on.

For example, the display 110 may display UI screens in various shapes relating to sensor arrangement. For example, the display 110 may display a UI screen providing a position of a sensor and a changed position of an existing sensor when a sensor is added, and a UI screen providing a changed position of remaining sensors when a sensor is removed.

The display 110, for example, may include a liquid crystal display (LCD), a light-emitting diode (LED) display, an organic light-emitting diode (OLED) display, a microelectromechanical systems (MEMS), or an electronic paper display, or the like, but is not limited thereto. In addition, the display 110 may include a touch screen according to an example embodiment. For example the display 110 may receive a touch including an e-pen or a portion of a user's body, gesture, proximity, or hovering inputs according to an example embodiment.

The processor 120 may include various processing circuitry and controls an overall operation of the electronic apparatus 100. The processor 120 may include various processing circuitry, such as, for example, and without limitation, at least one of a dedicated processor, a central processing unit (CPU), a controller, an application processor (AP), a communication processor (CP), and ARM processor. The processor 120, for example, may execute control and/or operation of communication or data processing of at least one elements of the electronic apparatus 100.

The processor 120, when an event to additionally arrange a first sensor in a specific service area occurs, identifies sensing coverage and network coverage of the second sensor based on position information, state information, and network information of the pre-arranged at least one second sensor.

The processor 120, based on sensing coverage and network coverage of the second sensor, and sensing coverage and network coverage of the first sensor to be added, may determine an arrangement position of the sensor and provide it through the display 110.

For example, the processor 120, while making sensing coverage and network coverage to not overlap each other, may determine an arrangement position of the first and second sensors so that sensing coverage and network coverage can reach a necessary region.

Herein, position information may, for example, be coordinate information in a specific service region. For example, it may be an absolute coordinate or a comparative coordinate based on a reference point (for example, a position of a TV) in a living room of a home. However, this is not limited thereto and any information which may specify or indicate a position of a sensor can be applicable.

Here, the state information may include at least one of output state information indicating power state that is currently sensed, battery information indicating current battery state, operation state information indicating currently-used sensing function, and network information currently used.

In this case, a battery state may, for example, indicate a remaining amount of battery, but may also include various information such as temperature, voltage during charging, current, or the like. Also, network information supported by a sensor itself and network information currently used may be different according to a battery state or the like, and in this case, network information currently used can be included in state information. In addition, a sensing function (e.g., temperature sensing and light sensing) supported by a sensor itself and sensing function (temperature sensing) which is currently activated in a sensor can be different. In this case, information on a sensing function which is currently activated can be included in state information.

Here, the sensing coverage may include a scope, region, area, or the like, which can be sensed. For example, the sensing coverage may include at least one of coverage of a sensor itself and coverage based on a battery state. The coverage of the sensor itself may be coverage which is determined based on a model or a version of the sensing chip itself, and when a manufacturer determines the coverage according to a model and a version and record corresponding data to a relevant server, the processor 120 may obtain the data online. In case of a sensor which is not registered in a server, a user may directly input coverage. For example, a user may directly sensing coverage information indicated in a rear surface of a sensor through a UI.

Here, the network coverage indicates a network scope which is covered by the network type (for example, BT, WiFi, etc.) supportable by each sensor. In the meantime, the network coverage can be affected from a battery state. For example, when a battery state is weak, it may affect BT or WiFi functions, and this may affect network coverage in BT or WiFi type.

The processor 120, based on the network coverage of the first and second sensors which is identified according to at least one network type supported by each of the first sensor and the second sensor, may determine an arrangement position of the second sensor first. The processor 120 may determine network coverage in further consideration of a battery state and electricity efficiency of each sensor.

For example, the processor 120 may enable that all the sensors in a service area are connected via one or more communication network, and in case of a sensor supporting two or more communication networks, communication network can be selected according to power efficiency and battery state/communication network type of adjacent devices.

For example, when an existing sensor A support BT network and sensor B which is to be added supports BT network and WiFi network, the sensor B can be arranged in the center first, and the sensor A can be arranged at a nearby area where network connection with the sensor B via BT network is available.

As another example, in case where the existing sensor A and sensor B support both BT network and WiFi network, the sensor B can be arranged at the center first, and when battery of the existing sensor A is low, the existing sensor A can be rendered so that BT network is operated and can be arranged at a nearby area where BT network with the sensor B is available.

In addition, the processor 120, when a position of the second sensor needs to be changed according to the determined arrangement position of the first sensor, may additionally determine an arrangement position of the second sensor. For example, in the above example embodiment, when the existing sensor A is arranged in the center, and when the B is added and a position needs to be changed to a boundary area, a position of the sensor B can be further determined.

In this case, the processor 120 may provide a changed arrangement position and an arrangement position before change of the second sensor through the display 110 or provide only a changed arrangement position through the display 110.

The communicator 130 may include various communication circuitry that communicates with various sensors including the first sensor and the second sensor.

The communicator 130 may build network system by conducting communication with the first and second sensors, using wired/wireless LAN, WAN, Ethernet, Bluetooth, Zigbee, IEEE 1394, WiFi or Power Line Communication (PLC). In addition, according to an example embodiment, the communicator 130 may communicate with a server (not shown) and a network device (not shown).

Here, the communicator 130 can be implemented to include a plurality of communication modules to perform communication according to various communication methods. For example, the communicator 130 may include various communication circuitry configured in various communication modules such as, for example, and without limitation, a WiFi communication module and a Bluetooth communication module.

In this case, the processor 120, when an event to add a sensor occurs, transmits an information request signal to at least one first sensor which is pre-arranged through the communicator 130, and according to an information request signal, may receive, through the communicator 130, position information, state information, and network information along with identification information (e.g., a model name of a sensor, a serial number, internet protocol (IP) address, or mac address) from the first sensor. Here, the state information may include at least one of current output state information, current operation state information, and battery state information. In the meantime, if some information (e.g., a sensor arrangement position, etc.) regarding pre-arranged sensors are already input, information other than pre-input information can be received.

In addition, the processor 120, when sensor type information is received from the second sensor, may identify sensing coverage and network coverage based on the position information, state information, network information, and sensor type information of the second sensor. Here, the sensor type information indicates type information of an optical sensor, a gas detection sensor, a pressure detection sensor (for checking a position of people or the number of people in a space). For example, it is suitable to arrange the sensors such as a gas detection sensor and a pressure detection sensor at a position which covers inside the service area by 100%. In the meantime, it is possible to obtain sensor type information from a server and so on based on a model name of a sensor or the like.

For example, the processor 120 may, based on at least one communication network supported by the first sensor and the second sensor and battery state of the first sensor and the second sensor, identify network coverage of the first sensor and the second sensor, and may identify sensing coverage of the first sensor and the second sensor based on at least one of a sensor type, a current output state, and a battery state of the first sensor and the second sensor.

In addition, the processor 120 may arrange a directional sensor on a preset position first. For example, it is appropriate to arrange an optical sensor and an acoustic sensor at a specific position such as a corner or a door due to their directional characteristic. In addition, in case of a sensor using WiFi network, a WiFi signal may not pass a concrete wall or a signal may become weak. Thus, an arrangement position may be determined in further consideration of the foregoing.

In addition, the processor 120, when an event to remove one of prearranged sensors occurs, may determine a rearrangement position based on sensing coverage of the removed sensor, and sensing coverage and network coverage of remaining sensors.

In the meantime, the processor 120, may transfer, to each sensor, a control signal to control an operation state of each sensor based on newly-set position information. Here, a control signal may include control signals such as specific sensing function ON/OFF, specific communication function ON/OFF, a sensing time adjustment signal, a sensing coverage adjustment signal, and a network coverage adjustment signal, or the like, but is not limited thereto.

For example, when the sensor B supports BT network and WiFi network and battery is weak, a control signal to turn off WiFi function of the sensor B so that BT network consuming less power is available can be sent to the sensor B.

As another example, when there is only the sensor B which is connected to the sensor C via WiFi network, in order to prevent and/or avoid unnecessary consumption of battery of the sensor C, a control signal to turn off the WiFi function of the sensor C can be further sent to the sensor C.

As still another example, when WiFi network coverage of the sensor D needs to be expanded, a control signal to increase output power of the sensor D can be transmitted to the sensor D so that WiFi network coverage of the sensor D can be expanded.

In addition, the processor 120 may determine an arrangement position of the first sensor based on an organic connection relation of the first sensor and the second sensor. For example, the processor 120, when a plurality of sensors including the first sensor are set to use a macro command, it is highly likely that the corresponding sensors perform a sensing operation at the same time, may determine an arrangement position of the first sensor in consideration of limitations according to simultaneous operation. Here, "macro" may refer, for example, to newly defining a plurality of commands which are repeatedly performed as one command.

In the meantime, if there is a preset priority in sensing type and network type, the processor 120 may determine an arrangement position of the sensor in consideration of the corresponding priority. For example, when a user sets a sensor to be additionally arranged to be the top priority, this sensor should be arranged to be at the optimum position and then an arrangement position of the remaining sensors can be adjusted. As another example, when WiFi network is set to the top priority from among communication networks, the arrangement position of the sensor can be adjusted first so that the WiFi network connection can be optimized.

In addition, the processor 120 may arrange the second sensor on an arrangement map of space which corresponds to service areas (for example, home, living room, kitchen, office, and lobby) and corresponds to the first sensor. In this case, the space arrangement map may be a home floor plan provided through a server, home floor map input by a user, and a snap shot image obtained by photographing. On the space arrangement map, factors that can affect to sensing coverage and network coverage such as a window, a door, and corner can be provided.

The processor 120 may control the display 110 to differently display the first sensor and the second sensor based on at least one of a sensor type and a network type of the first sensor and the second sensor. For example, according to at least one of the sensor type and network type of the first sensor and the second sensor, a shape and a color indicating sensing coverage and network coverage can be displayed differently. In addition, shape and color of the sensor can be displayed differently.

For example, sensing coverage (or network coverage) of each sensor can be indicated as a circle, and a size of the circle may indicate whether coverage is high or low. In addition, an area where a circle is overlapped may be an area where sensing coverage of each sensor is overlapped, that is, in case of the same sensing type, an area where sensing is done to be overlapped.

Figure 3:
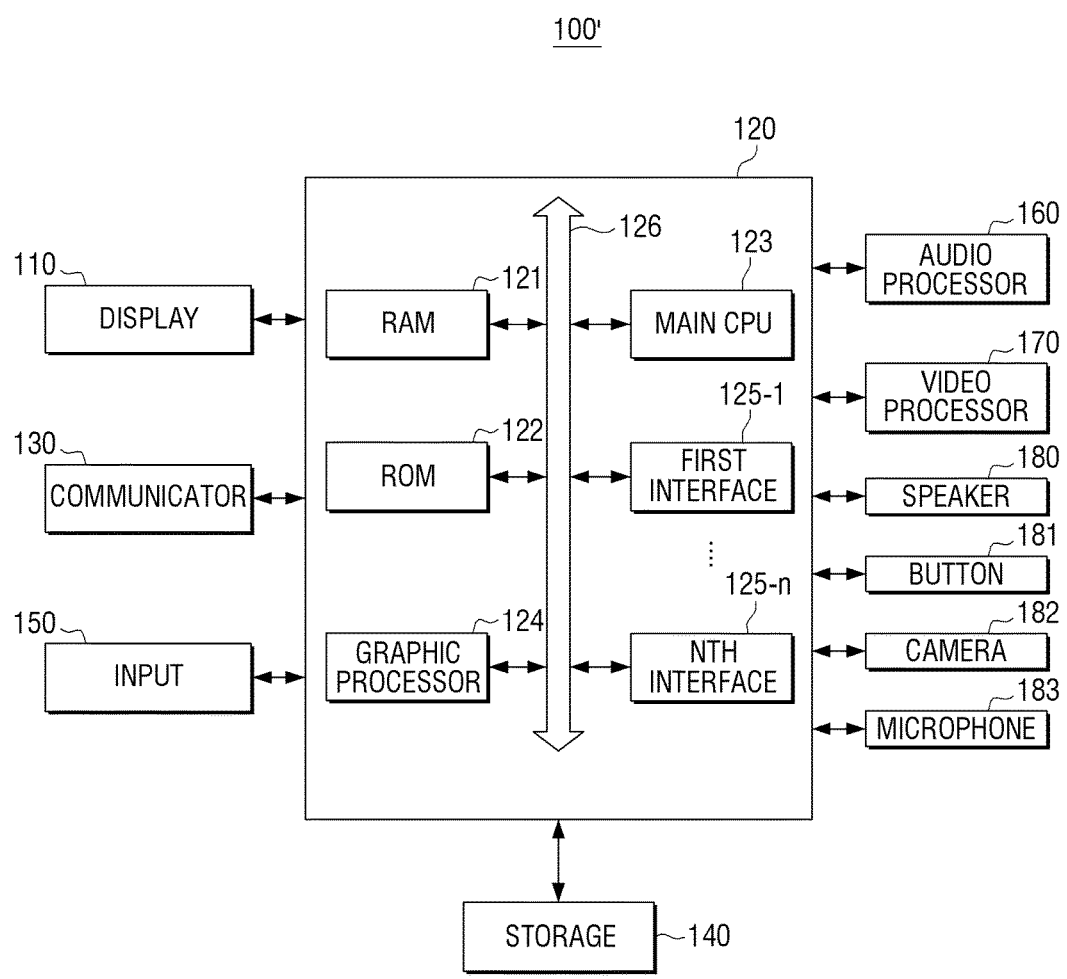
FIG. 3 is a block diagram illustrating an example configuration of the electronic apparatus illustrated in FIG. 2.

FIG. 3 is a block diagram illustrating an example configuration of the electronic apparatus illustrated in FIG. 2. According to FIG. 3, an electronic apparatus 100' includes the display 110, the processor (e.g., including processing circuitry) 120, the communicator (e.g., including communication circuitry) 130, a storage 140, an input (e.g., including input circuitry) 150, an audio processor 160, a video processor 170, a speaker 180, a button 181, a camera 182, and a microphone 183. A configuration of FIG. 3 which is overlapped with the configuration of FIG. 2 will not be further described.

The processor 120 may include various processing circuitry, such as, for example, and without limitation, one or more of a dedicated processor, a central processing unit (CPU), a controller, application processor (AP), communication processor (CP), or an ARM processor. The processor 120, for example, may perform calculation or data processing with respect to control and/or communication of at least one other elements of the electronic apparatus 100'.

For example, the processor 120 includes RAM 121, ROM 122, main CPU 123, a graphic processor 124, first to $n^{th}$ interface 125-1~125-n, and bus 126.

The RAM 121, ROM 122, main CPU 123, graphic processor 124, the first to $n^{th}$ interface 145-1~235-n can be interconnected through the bus 126.

The first to $n^{th}$ interface 125-1 to 125-n are connected to the aforementioned various elements. One of the interfaces may be network interface connected with an external device through network.

The main CPU 123, by accessing the storage 140, performs booting using the O/S stored in the storage 140. In addition, by using various programs, contents, and data stored in the storage 140, the main CPU performs various operations.

The ROM 122 stores a command set for system booting. When a turn-on command is input and power is supplied, the main CPU 123, according to a command stored in the ROM 122, copies O/S stored in the storage 140 to the RAM 121, and executes O/S to boot the system. When booting is completed, the main CPU 123 copies various programs stored in the storage 140 to the RAM 121, runs programs copied to the RAM 121, and execute various operations.

The graphic processor 124, by using a calculator (not shown) and a renderer (not shown), generates a screen including various objects such as an icon, an image, and a text. The calculator (not shown) calculates attribute values such as a coordinate value where each object is to be displayed according to layout of a screen based on the received control command, shape, size, and color. The renderer (not shown) generates a screen of various layouts including an object based on the attribute values calculated by the calculator (not shown). For example, the graphic processor 124 may generate a UI screen to provide arrangement information of a sensor. In the meantime, aforementioned operations of the processor 120 can be done by a program stored in the storage 140.

The storage 140 stores various data such as an operating system (O/S) software module to drive the electronic apparatus 100' and various multimedia contents.

Figure 4:
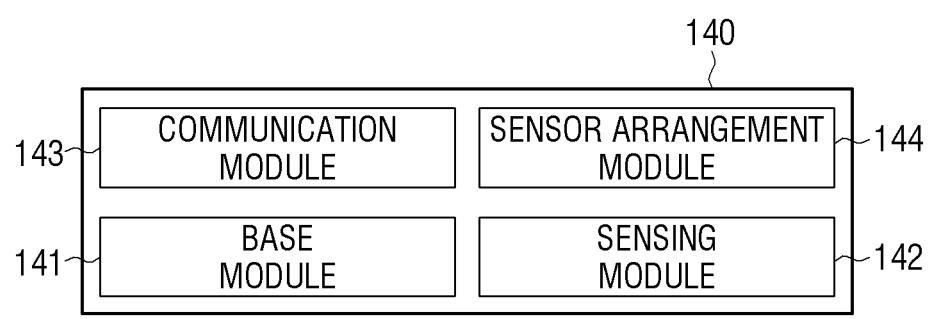
FIG. 4 is a diagram illustrating various example program modules stored in a storage according to an example embodiment of the present disclosure.

FIG. 4 is a diagram illustrating various example program modules stored in a storage. According to FIG. 4, the storage 140 may store software (e.g., program modules) including, for example, and without limitation, a base module 141, a sensing module 142, a communication module 143, and a sensor arrangement module 144.

The base module 141 may refer, for example, to a base module which signal-processes a signal delivered from each hardware included in the electronic apparatus 100 and transfers to an upper layer module. The base module 131 includes a storage module which manages DB or registry, security module to support certification, permission, and secure storage of hardware, and network module to support network connection.

The sensing module 142 may refer, for example, to a module to analyze and manage information received from the electronic apparatus 100' and collected by various sensors. The sensing module 142 may include luminance recognition module and NFC recognition module.

The communication module 143 may refer, for example, to a module for communicating with outside. The communication module 143 may include a device module (for example, a module for requesting advertisement data, a module for receiving advertisement data) used for communicating with an external device, in particular, a plurality of sensors, and a messaging module such as a messenger program, Short Message Service (SMS) & Multimedia Message Service (MMS) program, and an e-mail program.

The sensor arrangement module 144 may refer, for example, to a module for processing various information relating to sensor arrangement. The sensor arrangement module 144 may determine an arrangement position of an existing sensor and a sensor to be added to provide related information, or transmit a control signal required for each sensor, when initially arranging a sensor, changing a position of a sensor, and adding a sensor.

In addition, the storage 140 may further include a presentation module (not shown) for providing a display screen. The presentation module (not shown) may include a multimedia module to play and output multimedia contents and a UI rendering module to perform UI and graphic processing.

The input 150 may include various input circuitry configured to receive various user commands. For example, the input 150, when it deems necessary, receives information regarding a sensor and information regarding a service space (e.g., a window, a door, and a corner position in a home floor plan).

The input 150 may include various input circuitry according to an example of the electronic apparatus 100'. For example, when the electronic apparatus 100' is realized as a smart phone, as the input 150 may include input circuitry such as, for example, and without limitation, a touch panel enabling touch input.

The audio processor 160 may refer, for example, to an element that may include various circuitry to process audio data. The audio processor 160 may perform various processing such as decoding, amplification, and noise filtering of audio data.

The video processor 170 may refer, for example, to an element including various circuitry to perform processing of video data. The video processor 170 may perform various image processing such as decoding, scaling, noise filtering, frame rate conversion, and resolution conversion.

The speaker 181 may refer, for example, to an element including various circuitry to output not only audio data processed by the audio processor 160 but also alarm sounds and voice message. The camera 182 may refer, for example, to an element to photograph a still image or a moving image according to a user's control. The camera 182 may be implemented to be plural such as a front camera and a back camera. The microphone 183 may refer, for example, to an element including various circuitry to receive user voice or other sound to convert them to audio data. The processor 140 may use user voice which is input through the microphone 183 during calling process or convert to audio data and store in the storage 130. When there are the camera 182 and the microphone 183, the processor 120 may perform various control operations such as channel zapping according to user's voice input through the microphone 183 or user motion recognized by the camera 182. In addition, various external input ports to connect to various external terminals such as headset, mouse, and LAN can be further included.

In the meantime, FIG. 3 illustrates an example configuration of the electronic apparatus 100', and in some examples, a part of the configurations of FIG. 3 can be omitted or changed, or other elements can be further added.

Figure 5:
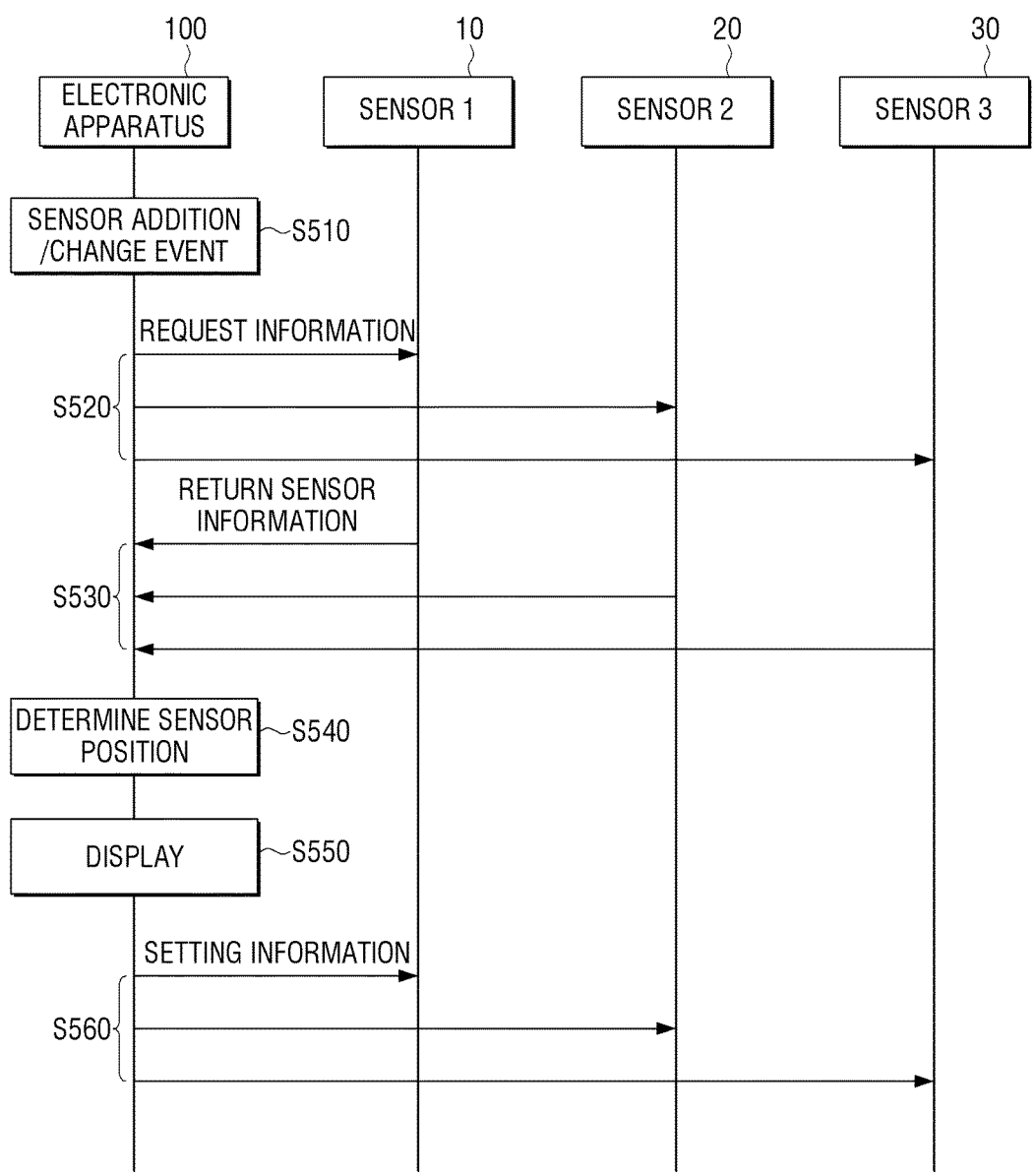
FIG. 5 is a sequence diagram illustrating an example method of arranging a sensor when a sensor is added according to an example embodiment of the present disclosure.

FIG. 5 is a sequence diagram illustrating an example method for arranging a sensor when a sensor is added according to an example embodiment of the present disclosure.

According to FIG. 5, when an event to add a sensor in a sensor network occurs, (S510), the electronic apparatus 100 transmits an information request signal to a plurality of sensors 1, 20, and 30 connected within the sensor network (S520).

Here, an event to add a sensor can be a case, for example, that a sensor addition command is input through an application to provide a service according to the present disclosure which is being driven in the electronic apparatus 100, but is not limited thereto, and for example, a case in which a sensor network (for example, the aforementioned network device or server) detects a sensor additionally connected to network automatically and notifies it to an application can be included.

The electronic apparatus 100 receives sensor information from a plurality of sensors 10, 20, and 30 within sensor network according to an information request signal (S530). Here, the received sensor information may include at least one of information of a sensor position in service area (e.g., home, living room in home, kitchen in home, etc.) having a sensor network, state information of each sensor, network information of each sensor, and type information of each sensor, and in some cases, received information can be different.

For example, when the electronic apparatus 100 knows position information of pre-arranged sensor in a service area, network information, and sensor type information according to pre-input information, state information of each sensor can be requested and received. In this case, each sensor can transmit only state information along with identification information to the electronic apparatus 100. Here, the state information of a sensor can include, for example, and without limitation, at least one of a battery state of a sensor, a currently-used function, a current output state (power consumption state), and currently-used network information.

The electronic apparatus 100, based on received information of each sensor, may identify sensing coverage and network coverage of each sensor, determine a position of a sensor to be added based thereon, and determine a changed position of a pre-arranged sensor according to necessity (S540).

For example, the electronic apparatus 100 may determine a first position of a sensor so that all the sensors are connected by network method in consideration of connectivity of each sensor first, and determine a final position of a sensor based on information such as other characteristics (e.g., whether it is a directional sensor), a sensor type (e.g., gas detection sensor, pressure detection sensor, etc.), and a state of a sensor (power efficiency of a sensor and a battery state of a sensor).

For example, when the sensor A supports BT network and the sensor B supports WiFi network, the sensor B can be arranged at the center first, and the sensor A can be arranged at surrounding areas where BT network with the sensor B is available.

In addition, directional sensors such as an optical sensor and an acoustic sensor can be arranged at specific positions (for example, corners or door).

In addition, in case of a WiFi sensor, this cannot pass through a concrete wall or a signal becomes weak, and an arrangement can be determined in further consideration of the foregoing.

In addition, when the sensor B supports BT network and WiFi network, and battery state is weak, the BT network can be arranged nearby a sensor so that BT network consuming less power can be used.

A position of each sensor determined at S540 is displayed through a display (not shown) (S550). Here, when the electronic apparatus 100 includes a display, a display can be done through the display, but when the electronic apparatus 100 is realized as a server not having a display, the information can be transmitted to an external electronic apparatus having a display.

In addition, according to the cases, the electronic apparatus 100 may transmit newly-set position information to each sensor (S560). For example, in case of a sensor which can move by itself (for example, in a case where determining coordinate within a service area is possible, and a sensor is movable to a designated coordinate), it can change a position itself by using the corresponding information.

Figure 6:
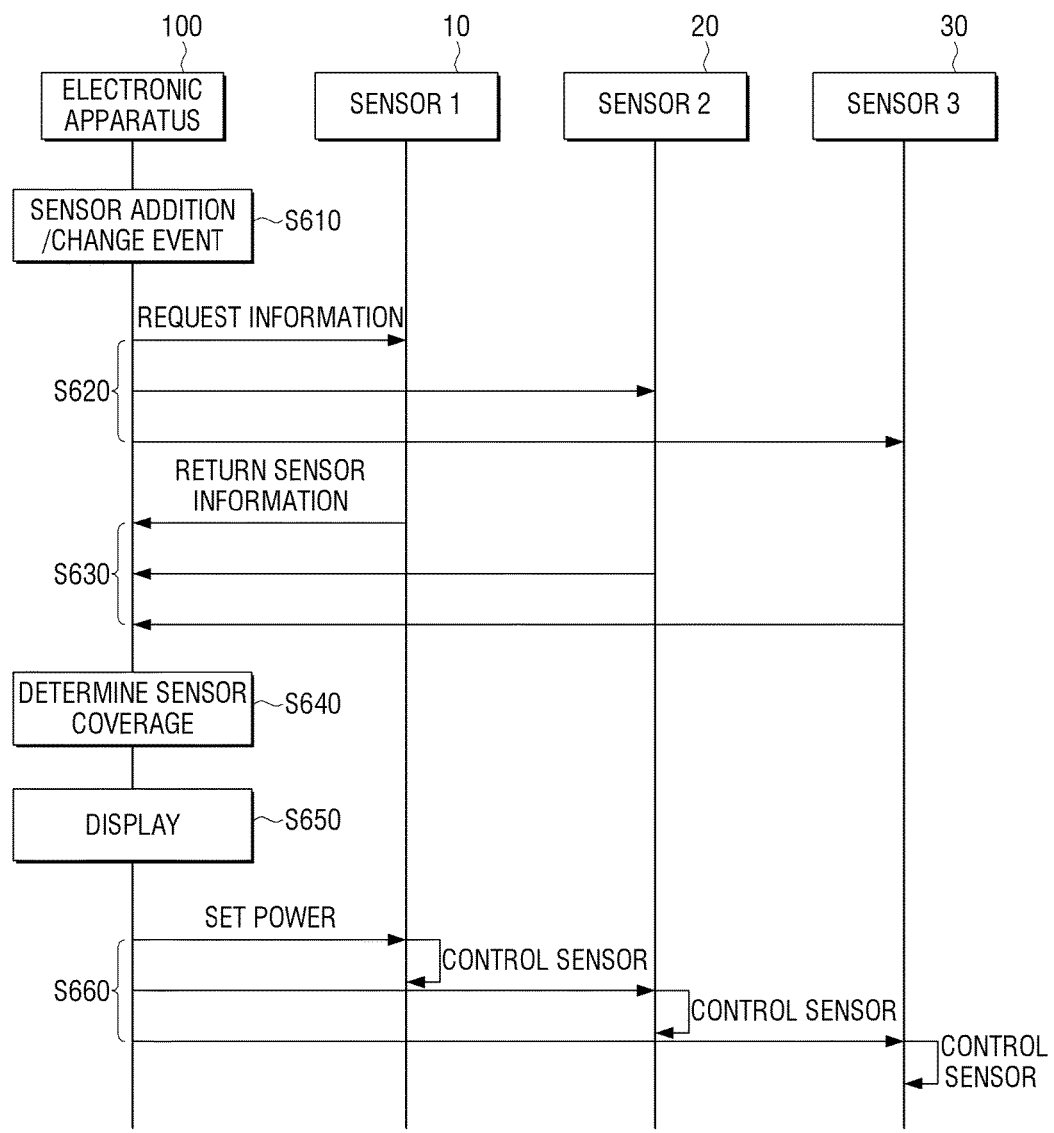
FIG. 6 is a sequence diagram illustrating an example method of adjusting coverage of a sensor when a sensor is added according to an example embodiment of the present disclosure.

FIG. 6 is a sequence diagram illustrating an example method for adjusting coverage of a sensor when a sensor is added according to an example embodiment of the present disclosure.

According to FIG. 6, when an event to add a sensor in network occurs (S610), the electronic apparatus 100 sends an information request signal to a plurality of sensors 10, 20, and 30 connected within the network (S620).

The electronic apparatus 100 receives sensor information from a plurality of sensors 10, 20, and 30 within the sensor network according to an information request signal (S630).

The electronic apparatus 100, based on received information of each sensor, may identify sensing coverage and network coverage of the sensor and determine a position of a sensor to be added and a position of a sensor which is arranged before (S640).

A position of each sensor which is determined in S640 is displayed through the display (not shown) (S650).

Aforementioned S610 to S650 are the same as or similar to S510 to S550 of FIG. 5 and thus will not be further described.

According to an example embodiment, the electronic apparatus 100 may transfer a control signal to control an operation status of each sensor to each sensor based on newly-set position information. Here, the control signal may include a specific sensing function ON/OFF, a specific communication function ON/OFF, a sensing time adjustment signal, a sensing coverage adjustment signal, and a network coverage adjustment signal.

For example, if it is necessary to turn off a function of WiFi of a sensor which supports BT network and WiFi network according to arrangement of a sensor, the corresponding control signal can be transmitted to the sensor. As another example, in case of a sensor which is arranged on a wall, a control signal to adjust battery output can be transmitted to the sensor in order to prevent wasted coverage.

Figure 7A:
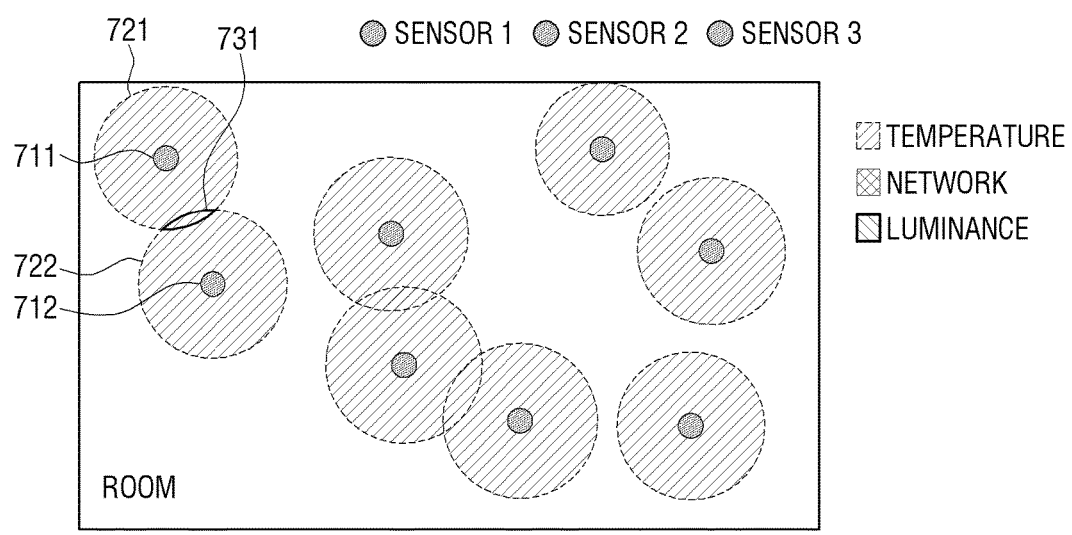
FIGS. 7A, 7B and 7C are diagrams illustrating an example method of providing a UI according to an example embodiment of the present disclosure.
Figure 7B:
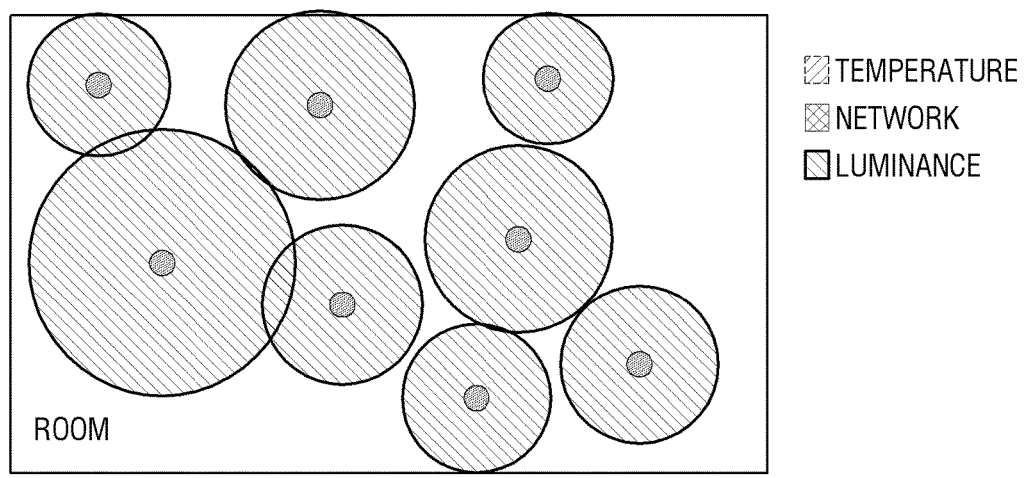
Figure 7C:
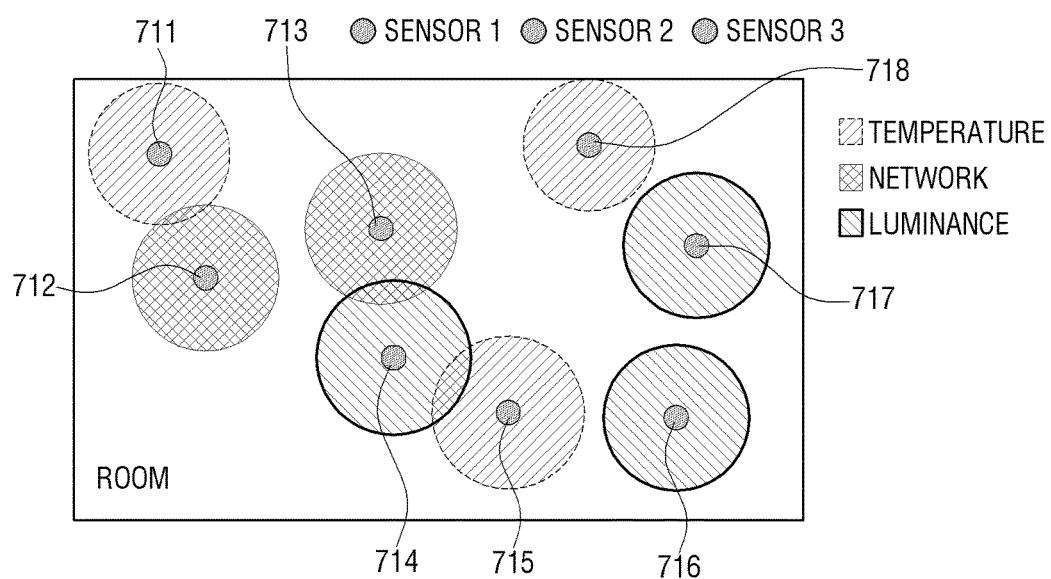

FIGS. 7A, 7B and 7C are diagrams illustrating an example method of providing a UI according to an example embodiment of the present disclosure.

As illustrated in FIGS. 7A, 7B and 7C, a UI providing an arrangement position of a sensor can be provided to be identifiable by sensor types, sensing coverage of each sensor can be indicated as, for example, a circle shape, an area which is covered as the circle shape indicates a sensing coverage. Accordingly, size of a circle can indicate whether coverage is high or low. In addition, an area where a circle is overlapped can be an area where sensing of each sensor is overlapped.

For example, an edge area in a rectangular shape indicates a preset service area and can be indicated in different colors by sensor types, but it is not limited thereto. For example, an identifiable shape which displays different shapes of each sensor and provides different indicators is applicable without being limited. In addition, as illustrated in FIG. 7A, an area 731 where the sensing coverage 721, 722 of each sensor 711, 712 is overlapped, that is, an area where a ring shape is overlapped can be indicated to be identifiable with other areas by indicating the area in different colors.

When a user selects a sensor of a certain type according to an exemplary embodiment, a sensor of a corresponding type can be illustrated from among the sensors arranged in the corresponding service area. FIG. 7A illustrates a case where a temperature sensor only is displayed, and FIG. 7B illustrates a case where only a luminance sensor is displayed.

FIG. 7C illustrates a case where all the sensors arranged in the corresponding service area are illustrated and each sensor can be displayed to be identifiable by sensor types. For example, a temperature sensor 711, 715, and 718, a network sensor 712, 713, an luminance sensor 714, 716, 717 can be indicated as different colors by sensor types.

Figure 8:
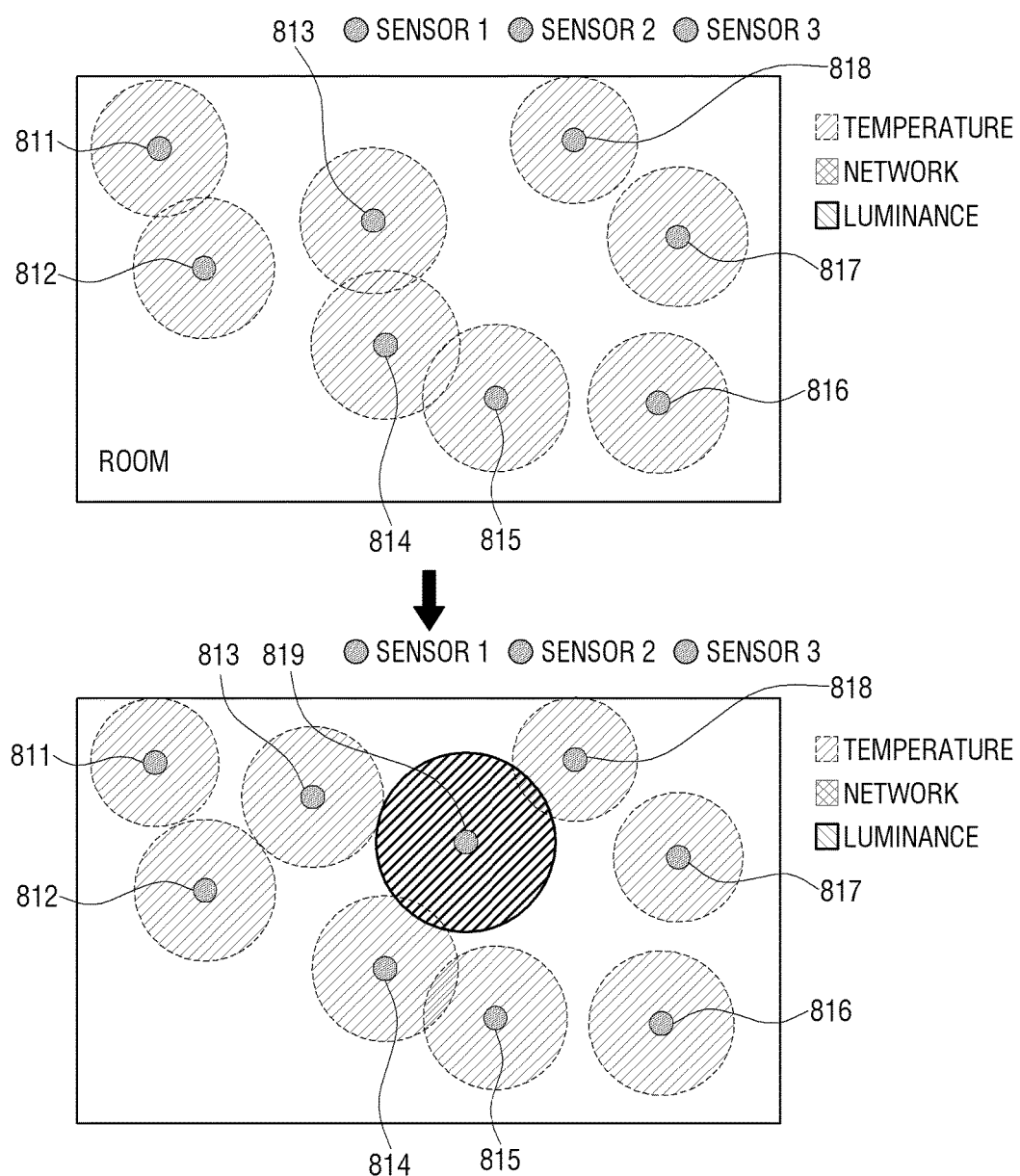
FIG. 8 is a diagram illustrating an example where a new sensor is added in a service area according to an example embodiment of the present disclosure.

FIG. 8 is a diagram illustrating an example where a new sensor is added in a service area according to an example embodiment of the present disclosure.

According to FIG. 8, when a sensor 819 is added while the former sensors 811 to 818 are arranged, a position of the sensor 819 to be added based on network coverage and sensing coverage of each sensor and positions of the former sensors 811 to 818 can be determined. For example, as illustrated in a lower side of FIG. 8, as the sensor 819 is added, positions of the former sensors 811 to 818 can be changed not to be overlapped from each other. In this case, the sensor 819 to be added can be displayed in different colors to be identifiable with the former sensors even when a sensor type is the same as that of the former sensors 811 to 818.

Figure 9:
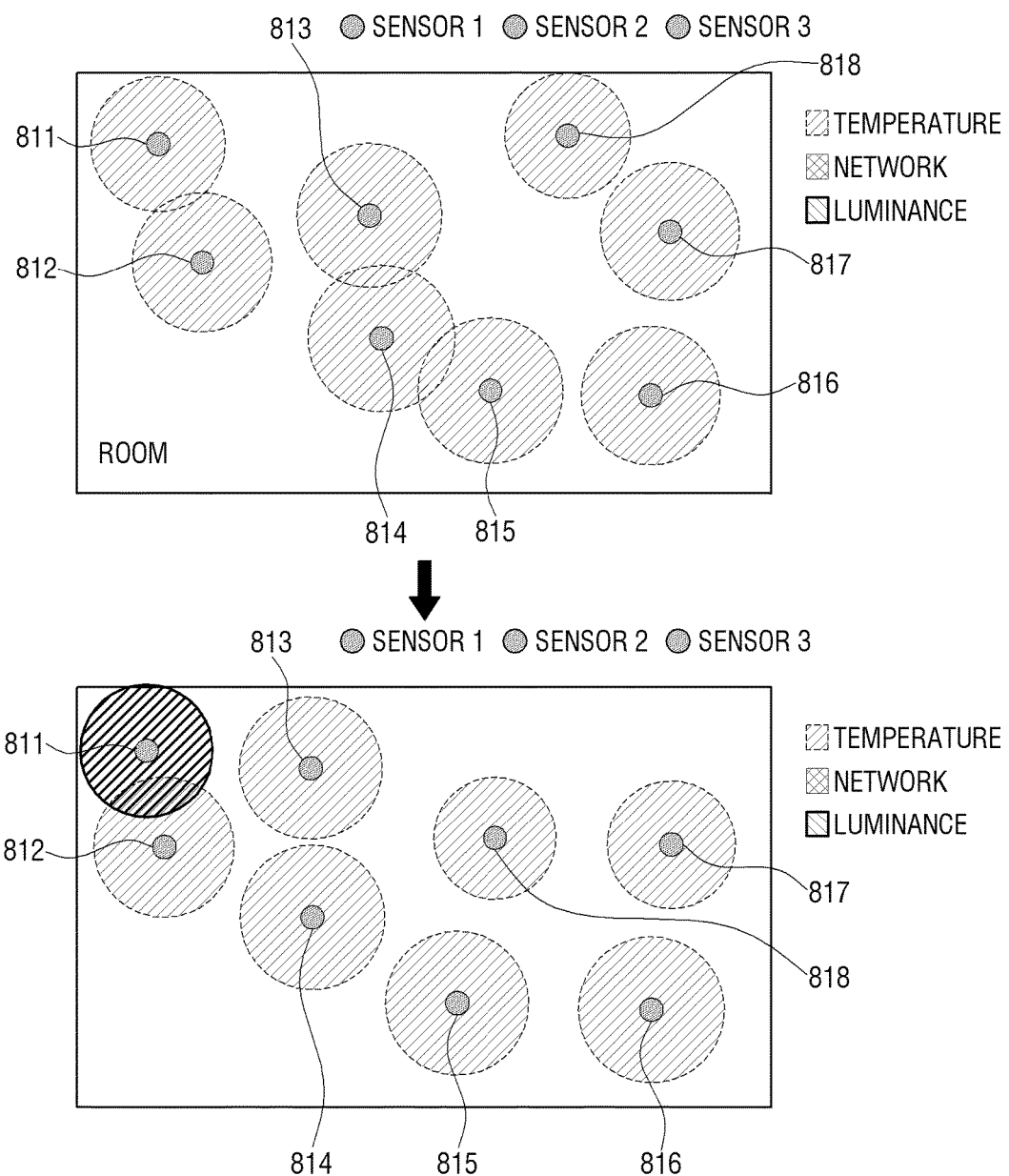
FIG. 9 is a diagram illustrating an example where a pre-arranged sensor is removed from a service area according to an example embodiment of the present disclosure.

FIG. 9 is a diagram illustrating an example where a pre-arranged sensor is removed from a service area according to an example embodiment of the present disclosure.

According to FIG. 9, when one of the prearranged sensors 811 is removed, based on network coverage and sensing coverage of remaining sensors, a new position of remaining sensors 812 to 818 can be determined. For example, as illustrated in a bottom of FIG. 9, the position can be changed to an appropriate position for substituting coverage of the sensor 811 from which coverage of the remaining sensors 812 to 818 is removed.

Figure 10A:
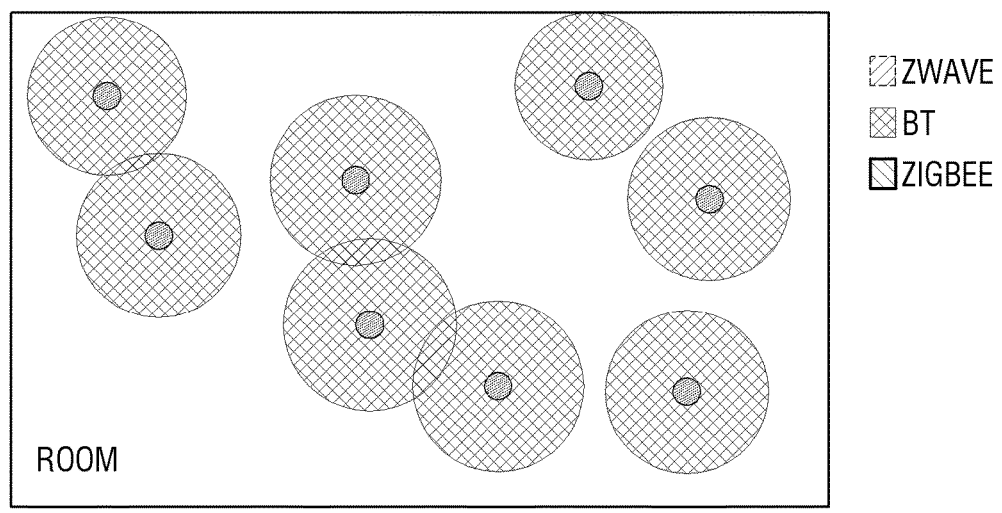
FIGS. 10A and 10B are diagrams illustrating an example method of providing an UI, according to another example embodiment of the present disclosure.
Figure 10B:
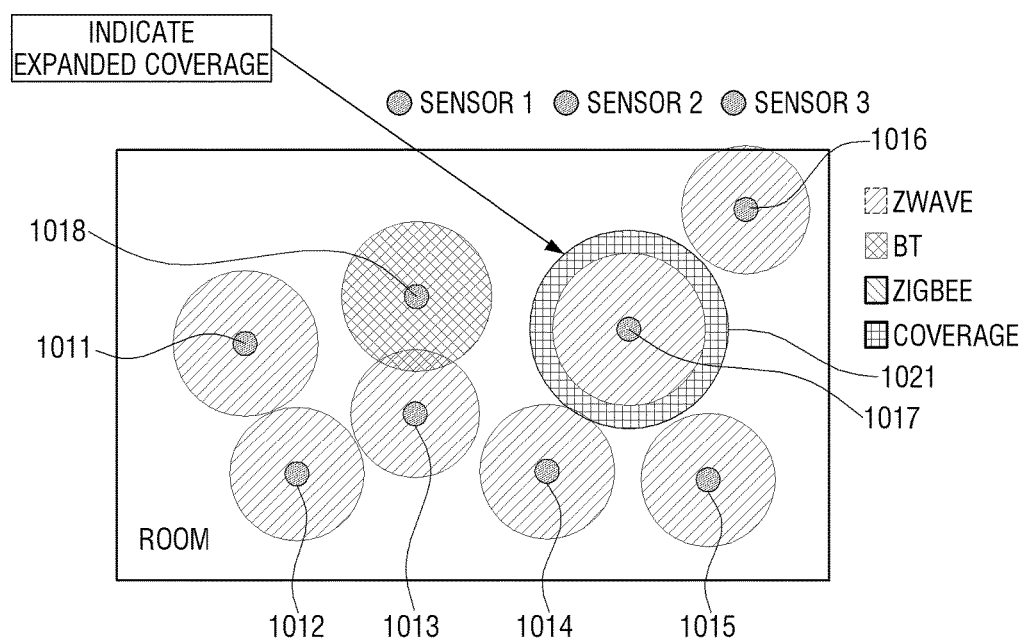

FIGS. 10A and 10B are diagrams illustrating an example method of providing an UI, according to another example embodiment of the present disclosure.

As illustrated in FIGS. 10A and 10B, a UI providing an arrangement position of a sensor can be provided to be identifiable by network types, and network coverage of each sensor can be indicated as a predetermined figure such as a circle shape. The area which is covered as a circle shape indicates network coverage area. In addition, an area where ring is overlapped may be an area where network of each sensor is formed to be overlapped.

For example, the illustrated edge area may indicate a predetermined service area and can be indicated to be different colors by network types, but it is not limited thereto. For example, an identifiable shape such as a shape different by network types and providing different indicators can be applicable without limitation.

According to an example embodiment, when a user selects specific communication network (for example, BT communication), sensors which are connected to the corresponding communication network from among the sensors arranged in the corresponding service area can be illustrated. FIG. 10A is a case where sensors supporting BT communication only are displayed, and sensors can exist in an empty area, but if BT communication is not supported, it would not be indicated.

FIG. 10B illustrates a case where all the sensors arranged in the corresponding service area are illustrated. Each sensor can be displayed to be identifiable by network types. For example, the sensors 1011 to 1017 which use Z WAVE communication and the sensor 1018 using the BT communication can be indicated in different colors by network types. In the meantime, when network coverage is adjusted by adjusting an output state, network coverage can be displayed to be identifiable using another color (e.g., coverage color).

Figure 11:
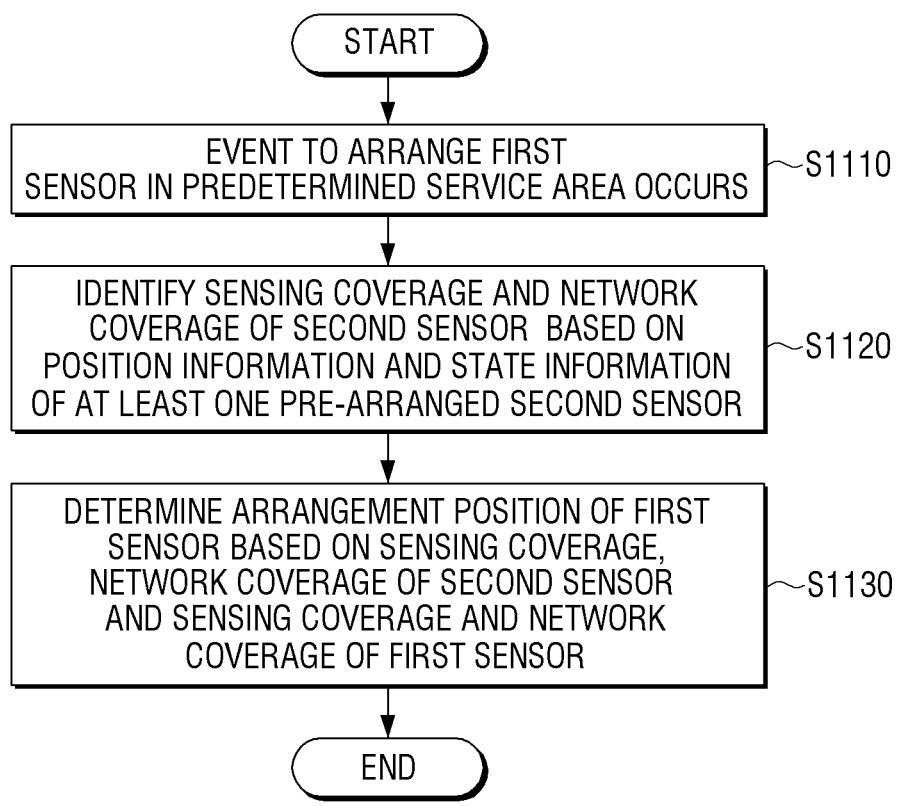
FIG. 11 is a flowchart illustrating an example method of arranging a sensor according to an example embodiment of the present disclosure.

FIG. 11 is a flowchart illustrating an example method of sensor arrangement according to an example embodiment of the present disclosure.

A sensor arrangement method according to an example embodiment is illustrated in FIG. 11. If an event to arrange the first sensor in a preset service area occurs (S1110), sensing coverage and network coverage of the second sensor is identified based on position information, state information, and network information of the pre-arranged at least one second sensor (S1120). Here, the sensor state information may include at least one of output state information indicating a state of power which can be sensed, operation state information indicating currently-sensed function, and state information of a battery.

Based on sensing coverage and network coverage of the second sensor, and sensing coverage and network coverage of the first sensor, an arrangement position of the first sensor would be determined (S1130).

In S1120 to identify sensing coverage and network coverage of the second sensor, if an event occurs, an information request signal can be transmitted to the second sensor and position information, state information, and network information can be received from the second sensor according to an information request signal.

In addition, in S1120 to identify sensing coverage and network coverage of the second sensor, sensor type information is additionally received from the second sensor, and based on the position information, state information, network information, and sensor type information of the second sensor, sensing coverage and network coverage of the second sensor may be identified.

In addition, in S1120 to identify sensing coverage and network coverage of the second sensor, network coverage of the second sensor can be identified based on at least one communication network and battery state of the second sensor, and sensing coverage of the second sensor can be identified based on at least one of sensor type of the second sensor, current output state and battery state of the second sensor.

In S1130 to determine an arrangement position of the first sensor, an arrangement position of the second sensor which is changed according to the determined arrangement position of the first sensor can be additionally determined.

In addition, in S1130 to determine an arrangement position of the first sensor, if the first sensor is a directional sensor, the first sensor can be arranged primarily at a predetermined position.

In addition, a method for arranging a sensor according to an example embodiment may further include, based on an arrangement position of the first sensor and the second sensor, transmitting a control signal to control at least one operation state out of the first sensor and the second sensor to the second sensor.

In addition, a sensor arrangement method according to an example embodiment may further include, when an event to remove one of at least one pre-arranged sensor occurs, determining a re-arrangement position of sensing coverage and network coverage of the remaining sensors.

In addition, a sensor arrangement method according to an example embodiment may additionally arranging and displaying the first sensor based on the determined position on a space arrangement map which corresponds to a service area and a position to correspond to the second sensor. In this case, according to at least one of the sensor type and network type of the first and second sensors, the first and second sensors can be displayed differently.

In addition, a sensor arrangement method according to an example embodiment, when an event to remove one of the at least one prearranged sensors occurs, may determine a re-arrangement method based on the sensing coverage of the removed sensor, sensing coverage and network coverage of the remaining sensors.

In the meantime, a sensor arrangement method according to an example embodiment can be realized to be performed by an application which is software a user directly uses on OS. In addition, an application can be provided on a screen of an electronic device as an icon interface, but it is not limited thereto.

As described above, according to the present disclosure, information on optimal and/or improved sensor arrangement position can be provided for initial installment of a sensor, changing a position, and adding a sensor and thus, user convenience would be improved.

In the meantime, a network device, a server, and a controlling method of a user terminal device according to various example embodiments can be embodied as a program code executable by computer and stored in various non-transitory computer readable medium and executed by the processor.

For example, a non-transitory computer readable medium storing a program including steps of displaying notification information according to display options previously stored in the electronic apparatus, and when a user interaction occurs to the notification information, adjusting the display options of the notification information such that the display options are modified based on the type of the user interaction.

The non-transitory computer readable recording medium refers to a medium that can store data at least semi-permanently. For example, various applications or programs described above may be stored and provided on a non-transitory computer readable recording medium such as CD, DVD, hard disk, blue-ray disk, USB, memory card, ROM, and so on.

The foregoing example embodiments and advantages are merely examples and are not intended to be limiting. The present disclosure can be readily applied to other types of apparatuses. Also, the description of the example embodiments of the present disclosure is intended to be illustrative, and not to limit the scope of the claims.

What is claimed is:

1. A sensor arrangement method comprising:
    identifying, in response to detecting occurrence of an event for arranging a first sensor, in addition to a second sensor in a preset service area, sensing coverage and network coverage of the second sensor based on position information, state information of the second sensor and network information of a network supported by the second sensor; and
    determining an arrangement position of the first sensor based on the sensing coverage and network coverage of the second sensor, and sensing coverage and network coverage of the first sensor.

2. The method as claimed in claim 1, wherein the identifying comprises:
    transmitting an information request signal to the second sensor in response to the detecting of occurrence of the event; and
    receiving, from the second sensor, based on the information request signal, the position information, the state information, and the network information.

3. The method as claimed in claim 2, wherein the identifying comprises:
    receiving, from the second sensor, sensor type information, and identifying the sensing coverage and network coverage of the second sensor based on the position information, the state information, the network information, and the sensor type information.

4. The method as claimed in claim 1, wherein the state information comprises at least one of output state information including a power state capable of being sensed, operation state information including a function currently being sensed, and battery state information.

5. The method as claimed in claim 1, wherein the identifying comprises:
    identifying the network coverage of the second sensor based on at least one communication network supported by the second sensor and a battery state of the second sensor, respectively; and
    identifying the sensing coverage of the second sensor based on at least one of: a sensor type, a current output state, and a battery state of the second sensor.

6. The method as claimed in claim 1, wherein the determining of a position of the first sensor further comprises:
    determining a changed arrangement position of the second sensor based on the determined arrangement position of the first sensor.

7. The method as claimed in claim 1, wherein the determining of an arrangement position of the first sensor comprises: arranging the first sensor at a preset position, based on the first sensor being a directional sensor.

8. The method as claimed in claim 1, further comprising:
    transmitting a control signal to the second sensor to control an operation state of at least one of: the first sensor and the second sensor, based on arrangement positions of the first sensor and the second sensor.

9. The method as claimed in claim 1, further comprising:
    determining a re-arrangement position of a remaining sensor in response to detecting occurrence of an event for removing one of already-arranged sensors, the re-arrangement position being based on sensing coverage of the removed sensor, and sensing coverage and network coverage of the remaining sensor.

10. The method as claimed in claim 1, further comprising:
    arranging and displaying a representation of the first sensor on an area arrangement map corresponding to the service area, based on the determined position,
    wherein the arranging and displaying of the representation of the first sensor comprises differently displaying the representation of the first sensor and a representation of the second sensor based on at least one of: a sensor type and a network type of the first sensor and the second sensor.

11. An electronic apparatus comprising:
    communication circuitry;
    a display; and
    a processor configured to:
        identify, in response to detecting occurrence of an event for arranging a first sensor, in addition to a second sensor in a preset service area, sensing coverage and network coverage of the second sensor based on position information, state information of the second sensor, and network information of a network supported by the second sensor,
        determine an arrangement position of the first sensor based on the sensing coverage and network coverage of the second sensor and sensing coverage and network coverage of the first sensor, and
        output the determined position via the display.

12. The electronic apparatus as claimed in claim 11, wherein the processor is configured to, in response to detecting occurrence of the event occurring, control the communication circuitry to transmit an information request signal to the second sensor, and receive, from the second sensor, based on the information request signal, the position information, the state information, and the network information.

13. The electronic apparatus as claimed in claim 12, wherein the processor is configured to receive, from the second sensor, sensor type information, and to identify sensing coverage and network coverage based on the position information, the state information, the network information, and the sensor type information.

14. The electronic apparatus as claimed in claim 11, wherein the state information comprises at least one of: output state information including a power state capable of being sensed, operation state information including a function currently being sensed, and battery state information.

15. The electronic apparatus as claimed in claim 11, wherein the processor is configured to:

identify the network coverage of the second sensor based on at least one communication network supported by the second sensor and a battery state of the second sensor, respectively, and identify the sensing coverage of the second sensor based on at least one of: a sensor type, a current output type, and a battery state of the second sensor.

16. The electronic apparatus as claimed in claim 11, wherein the processor is configured to determine a changed arrangement position of the second sensor based on an arrangement position of the determined first sensor.

17. The electronic apparatus as claimed in claim 11, wherein the processor is configured to, based on determining that the first sensor is a directional sensor, arrange the first sensor at a preset position.

18. The electronic apparatus as claimed in claim 11, wherein the processor is configured to, based on an arrangement position of the first sensor and the second sensor, transmit a control signal to the second sensor to control an operation state of at least one of: the first sensor and the second sensor.

19. The electronic apparatus as claimed in claim 11, wherein the processor is configured to, in response to detecting occurrence of an event for removing one of already-arranged sensors, determine a re-arrangement position of a remaining sensor based on sensing coverage and network coverage of the remaining sensor.

20. The electronic apparatus as claimed in claim 11, wherein the processor is configured to control the display to arrange and display a representation of the first sensor on an area arrangement map corresponding to the service area, based on the determined position, and to display the representation of the first sensor and a representation of the second sensor differently based on at least one of: a sensor type and a network type of the first sensor and the second sensor.

* * * * *